(12) United States Patent
Niu et al.

(10) Patent No.: US 7,898,478 B2
(45) Date of Patent: *Mar. 1, 2011

(54) METHOD AND SYSTEM FOR ANALOG BEAMFORMING IN WIRELESS COMMUNICATION SYSTEMS

(75) Inventors: Huaning Niu, Sunnyvale, CA (US); Pengfei Xia, Mountain View, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 123 days.

This patent is subject to a terminal disclaimer.

(21) Appl. No.: 11/881,978

(22) Filed: Jul. 30, 2007

(65) Prior Publication Data
US 2008/0204319 A1 Aug. 28, 2008

Related U.S. Application Data

(60) Provisional application No. 60/904,030, filed on Feb. 28, 2007.

(51) Int. Cl.
*H01Q 3/00* (2006.01)
*H01Q 3/12* (2006.01)

(52) U.S. Cl. .................. 342/377; 342/373; 342/374

(58) Field of Classification Search ......... 342/372–374, 342/377; 375/259; 455/276.1, 277.1, 562.1
See application file for complete search history.

(56) References Cited

U.S. PATENT DOCUMENTS

| 5,955,991 | A | 9/1999 | Kawakubo |
| 6,590,532 | B1 | 7/2003 | Ogawa et al. |
| 6,795,392 | B1 | 9/2004 | Li et al. |
| 7,039,370 | B2 | 5/2006 | Laroia et al. |
| 7,161,534 | B2 | 1/2007 | Tsai et al. |
| 7,239,893 | B2 * | 7/2007 | Yang ........................ 455/561 |
| 7,312,750 | B2 | 12/2007 | Mao et al. |
| 7,342,535 | B2 * | 3/2008 | Ann et al. .................. 342/377 |
| 7,450,659 | B2 | 11/2008 | Corredoura et al. |
| 2002/0122498 | A1 * | 9/2002 | Dogan ....................... 375/259 |
| 2002/0128027 | A1 | 9/2002 | Wong et al. |
| 2002/0147032 | A1 * | 10/2002 | Yoon et al. ................. 455/562 |

(Continued)

FOREIGN PATENT DOCUMENTS

JP 2004140642 A2 5/2004

OTHER PUBLICATIONS

WirelessHD Specification draft version 0.7, WirelessHD consortium, Feb. 2007.

(Continued)

*Primary Examiner*—Dao L Phan
(74) *Attorney, Agent, or Firm*—Kenneth L. Sherman, Esq.; Michael Zarrabian, Esq.; Myers Andras Sherman & Zarrabian LLP

(57) ABSTRACT

A method and system for analog beamforming in a wireless system is provided. Analog beamforming involves performing an iterative beam acquisition process based on beam search training, determining transmit and receive beamforming vectors including phase weighting coefficients, based on the iterative beam acquisition process. Each iteration includes estimating the receive and transmit beamforming coefficients alternatively, until the receive and transmit beamforming coefficients converge.

35 Claims, 6 Drawing Sheets

U.S. PATENT DOCUMENTS

| | | | |
|---|---|---|---|
| 2003/0201936 | A1 | 10/2003 | Kim |
| 2005/0276347 | A1 | 12/2005 | Mujtaba et al. |
| 2006/0104382 | A1* | 5/2006 | Yang et al. ............... 375/267 |
| 2006/0234645 | A1 | 10/2006 | Lin et al. |
| 2006/0248429 | A1 | 11/2006 | Grandhi et al. |
| 2007/0189412 | A1 | 8/2007 | Xia et al. |
| 2007/0205943 | A1 | 9/2007 | Nassiri-Toussi et al. |
| 2008/0101493 | A1 | 5/2008 | Niu et al. |
| 2008/0108390 | A1* | 5/2008 | Yoon et al. ............... 455/561 |
| 2008/0134254 | A1 | 6/2008 | Xia et al. |
| 2008/0144751 | A1* | 6/2008 | Xia et al. ............... 375/347 |
| 2009/0033555 | A1 | 2/2009 | Niu et al. |
| 2009/0121935 | A1 | 5/2009 | Xia et al. |
| 2009/0233556 | A1 | 9/2009 | Xia et al. |

OTHER PUBLICATIONS

"Draft Amendment to Standard for Information Technology-Telecommunications and information exchange between systems-Local and metropolitan area networks-Specific requirements-Part 11: Wireless LAN Medium Access Control (MAC) and Physical Layer (PHY) specifications: Enhancements for Higher Throughput," IEEE P802.11n/D1.0, Mar. 2006).

Van Veen, B.D.; and Buckley, K.M., "Beamforming: a versatile approach to spatial filtering", ASSP Magazine, IEEE, vol. 5, Iss. 2, Apr. 1988, pp. 4-24.

U.S. Appl. No. 11/899,286, filed Sep. 5, 2007, Pengfei Xia et al.

Butler, J. and Lowe, R., "Beam-Forming Matrix Simplifies Design of Electronically Scanned Antennas", Electronic Design, pp. 170-173, Apr. 12, 1961.

Hansen, R.C., "Phased Array Antennas", pp. 1-507, John Wiley and Sons, New York, 1998.

Coffey, S., et al., "Joint Proposal: High throughput extension to the 802.11 Standard: PHY", doc.: IEEE 802.11-05/1102r4, draft proposal, Jan. 2006, pp. 1-82.

Niu, H. and Ngo, C., "Beamforming for Space-Time Coded IEEE 802.11n System with Known Fading Correlations", in Proceeding of 90th Asilomar Conference on Signals, Systems and Computers, Pacific Grove, CA, Nov. 2005.

U.S. Non-Final Office Action for U.S. Appl. No. 11/890,207 mailed Jun. 23, 2008.

U.S. Final Office Action for U.S. Appl. No. 11/890,207 mailed Nov. 24, 2008.

Advisory Action for U.S. Appl. No. 11/890,207 mailed Mar. 2, 2009.

U.S. Non-Final Office Action for U.S. Appl. No. 11/890,207 mailed Apr. 6, 2009.

G. Stuber, J. Barry, S. McLaughlin, Y. Li, M.Ingram and T. Pratt, "Broadband MIMO-OFDM wireless communications," Proceedings of the IEEE, vol. 92, No. 2, pp. 271-294, Feb. 2004.

High-Definition Multimedia (HDMI) Specification, Version 1.2, Aug. 22, 2005, pp. 1-214.

IEEE Std 802.15.3, "Wireless Medium Access Control (MAC) and Physical Layer (PHY) Specifications for High Rate Wireless Personal Areas Networks (WPANs)", 2003, pp. 1-324.

J. De Los Santos, "MEMS-Based Microwave Circuits and Systems, Introduction to Microelectromechanical (MEM) Microwave Systems", Artech House, p. 167-168 and 193, 1999.

S. Furrer et al., "Bounds on the ergodic capacity of training-based multiple-antenna systems", Internal Symposium on Information Theory, p. 780-784, Sep. 2005.

S. Buzzi et al., Performance of iterative data detection and channel estimation for single-antenna and multiple-antennas wireless communications, IEEE Transactions on Vehicular Technology, vol. 53(4), p. 1085-1104, Jun 2004.

U.S. Non-final Office Action for U.S. Appl. No. 11/899,286 mailed Sep. 24, 2009.

Scintera Networks, "Advanced Signal Processing Platform," Sep. 2003, pp. 1-9, United States.

Razavi, B., "Challenges in Portable RF Transceiver Design." Circuits & Devices, IEEE, Sep. 2006, pp. 12-25, United States.

U.S. Non-Final Office Action for U.S. Appl. No. 11/706,942 mailed Oct. 15, 2009.

U.S. Final Office Action for U.S. Appl. No. 11/890,207 mailed Oct. 26, 2009.

U.S. Notice of Allowance for U.S. Appl. No. 11/890,207 mailed Jan. 11, 2010.

U.S. Notice of Allowance for U.S. Appl. No. 11/899,286 mailed Jan. 21, 2010.

* cited by examiner

50

METHOD AND SYSTEM FOR ANALOG BEAMFORMING IN WIRELESS COMMUNICATION SYSTEMS

RELATED APPLICATION

This application claims priority from U.S. Provisional Patent Application Ser. No. 60/904,030 filed on Feb. 28, 2007, incorporated herein by reference.

FIELD OF THE INVENTION

The present invention relates to wireless networks, and in particular to beamforming transmissions in wireless networks.

BACKGROUND OF THE INVENTION

High speed wireless communications over high frequency bands suffer severe path loss, and thus require high gain antennas. Existing methods to enable high antenna gain include use of directional antennas and use of antenna arrays. The latter is often preferred because a beam direction can be adaptively steered in an electronic manner. Antenna array beamforming (BF) provides increased signal quality due to high directional antenna gain. Further, steering the transmitted signal in a dedicated direction extends the communication range.

A beamforming operation can be implemented in an analog domain, after a digital-to-analog converter (D/A or DAC) at a transmit station and before an analog-to-digital converter (A/D or ADC) at a receive station. Beamforming can also be implemented in the digital domain, before the D/A at the transmit station and after the A/D at the receive station.

Digital beamforming is proposed in the 802.11n draft specification ("Draft Amendment to Standard for Information Technology-Telecommunications and information exchange between systems-Local and metropolitan area networks-Specific requirements-Part 11: Wireless LAN Medium Access Control (MAC) and Physical Layer (PHY) specifications: Enhancements for Higher Throughput," IEEE P802.11n/D1.0, March 2006). Digital beamforming using eigen-decomposition is an optimal approach, providing the highest throughput and reliability.

However, digital beamforming is a costly scheme because it requires the same number of radio frequency (RF) chains as the number of antennas in an antenna array. Analog beamforming, on the other hand, requires one RF chain for an antenna array. For applications such as 60 GHz frequency band wireless networks (e.g., wireless high-definition or WirelessHD), since the bandwidth is high (the spectrum efficiency is not high), reliable transmission of one data stream via an RF chain over an antenna array is satisfactory. Analog beamforming provides a simple solution to reduce the RF chain cost while maintaining the array gain.

In a related iterative analog beamforming scheme, a beam search protocol is based on explicit feedback of a transmit beamforming vector between a first station STA1 (a BF transmitter) and a second station STA2 (a BF receiver). To estimate the optimal transmit beamforming vector, the transmitter uses switch beamforming and switches across all possible beams. This approach is useful in finding a transmit beamforming vector in the initial stage of a beamforming search protocol. However, if a useful initial estimate of the receive beamforming vector is required, then such an approach cannot be applied because switching across all transmit beams cannot be performed for estimating the optimum receive beamforming vector, while maintaining a sufficient link budget.

BRIEF SUMMARY OF THE INVENTION

The present invention provides a method and system for analog beamforming in wireless communication systems. In one embodiment such analog beamforming includes an iterative process involving a transmitter and a receiver.

Based on beam search training, an iterative beam acquisition process is performed for finding optimized transmit and receive beamforming vectors including phase weighting coefficients.

Each iteration involves estimating the receive and transmit beamforming coefficients alternatively, until the receive and transmit beamforming coefficients converge.

These and other features, aspects and advantages of the present invention will become understood with reference to the following description, appended claims and accompanying figures.

DETAILED DESCRIPTION OF THE INVENTION

The present invention provides a method and system for analog beamforming in a wireless communication system including wireless stations that can transmit and/or receive information. In one embodiment such analog beamforming includes an iterative process involving a transmitter and a receiver.

Before communication of actual payload data, a certain sequence is transmitted from a transmitting station (transmitter) to a receiving station (receiver) for performing channel estimation and beam estimation. An iterative training protocol and an iterative beam searching process for analog beamforming are performed. The iterative training protocol allows determining a beamforming vector (BV) for analog adaptive beamforming. At the end of the iterative training protocol, the iterative beam search is also completed and beamforming is carried out simultaneously at the transmitter side and the receiver side. This allows for adaptive beamforming wherein the BV is adapted according to communication channel variations. Adaptive beamforming is also more versatile in suppressing interference and in extending the communication range.

An example implementation of the present invention in a WirelessHD beamforming 60 GHz communication system is described below. WirelessHD is an industry-led effort to define a wireless digital network interface specification for wireless high-definition digital signal transmission on the 60 GHz frequency band, e.g., for consumer electronics products. As those skilled in the art of wireless beamforming will recognize, other implementations are possible and the teachings of the present invention are applicable to other wireless communication systems as well.

Figure 1:
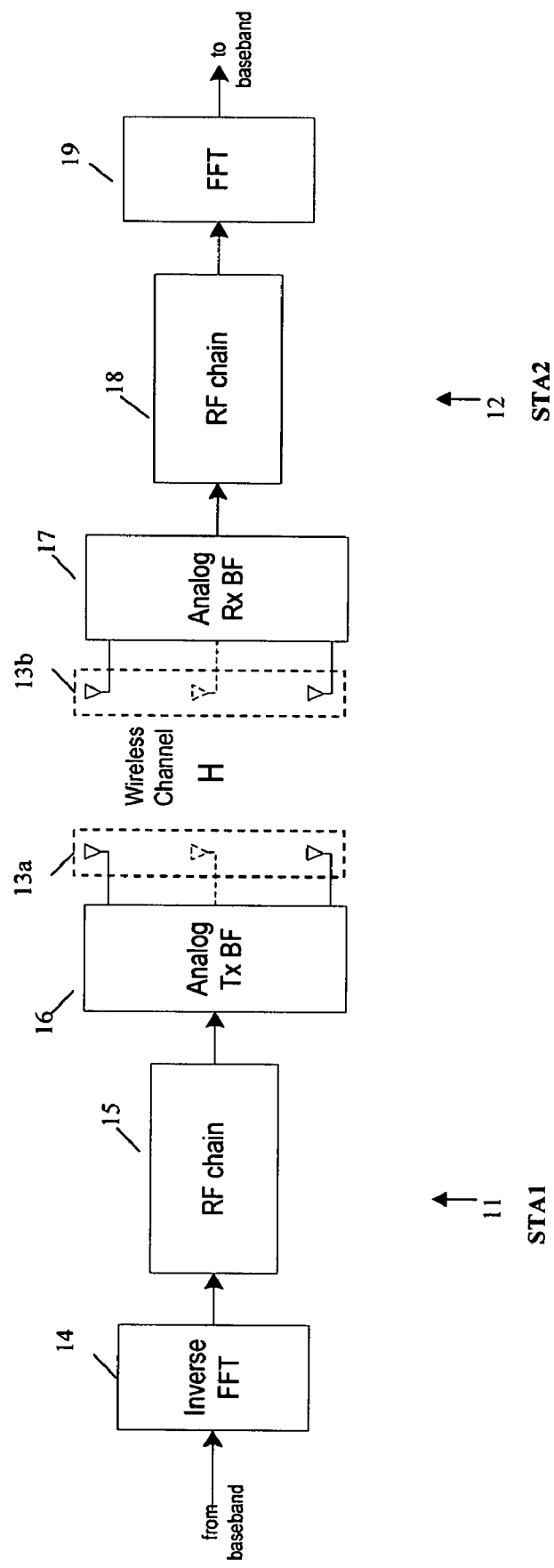
FIG. 1 shows a functional block diagram of an analog beamforming wireless system implementing an embodiment of the present invention.

FIG. 1 shows an analog beamforming wireless system 10, such as a WirelessHD system including two beamforming stations 11 and 12 (BF stations STA1 and STA2) providing an implicit beamforming framework, according to an embodiment of the present invention. The stations 11 and 12 comprise transceivers that include antenna arrays 13a and 13b, respectively.

The transmit (TX) function of the station 11 includes an inverse Fast Fourier Transform (IFFT) 14 which mainly converts a baseband signal from the frequency domain into a time domain digital signal. The digital signal is then converted into an analog waveform by a D/A function of an RF chain 15, and is then transmitted to the station 12 after analog beamforming by an analog TX BF function 16.

The receive (RX) function of the station 12 includes an analog RX BF function 17 which cooperatively with the analog TX BF function 16 provides analog beamforming. The analog output signal from the analog RX BF function 17 is converted to a digital signal in an RF chain 18, and then converted to the frequency baseband signal by an FFT 19.

A symmetric transceiver structure is assumed for training, wherein both the transmitter and receiver are able to send and receive in high speed at the 60 GHz frequency band. Transmission and reception take place in a time division duplexing (TDD) manner, wherein channel reciprocity can be used to reduce the training overhead. Normally, channel calibration is required to assure the channel reciprocity.

An adaptive beamforming process is implemented by the TX BF function 16 and the RX BF function 17. The adaptive beamforming process includes beam searching and beam tracking procedures for implicit beamforming. An iterative beam searching process and a beam tracking sequence exchange process, utilize the channel reciprocity to reduce the training overhead and improve system throughput. The beam tracking procedure is similar to the beam search procedure and is based on a one-time training of each transceiver.

Specifically, transmit and receive beamforming coefficients for beamforming vectors are obtained iteratively. In one example, each iteration involves estimating interim receive and transmit beamforming coefficients alternatively, until the receive and transmit beamforming coefficients converge in a terminating iteration, providing final (optimum) beamforming vectors.

In one implementation, described herein below, a transmitter BV (i.e., antenna weighting coefficient) training is performed over a reverse multiple-input-multiple-output (MIMO) channel (e.g., from the RX 12 to the TX 11), while receiver BV training takes place over the forward MIMO channel (e.g., from the TX 11 to the RX 12). An estimation of an optimal transmitter BV is performed at the beamforming transmitter 11, and estimation of an optimal receiver BV is performed at the beamforming receiver 12. As a result, there is no need to exchange the estimated BV, thereby reducing the signaling overhead. The adaptive beamforming protocols described herein can be used to establish a high rate (HRP) data link or a low rate (LRP) data link.

Training and Beam Searching

During the entire communication period, a wireless station may experience three different states: a beam-lost state, a beam-deviated state and a beam-acquired state. In a beam-lost state, beamforming is completely lost, calling for a new search of beamforming vectors. In a beam-deviated state, beamforming is slightly deviated, generally calling for a beam tracking operation. In a beam-acquired state beamforming is optimally acquired and data communications may follow.

Figure 2:
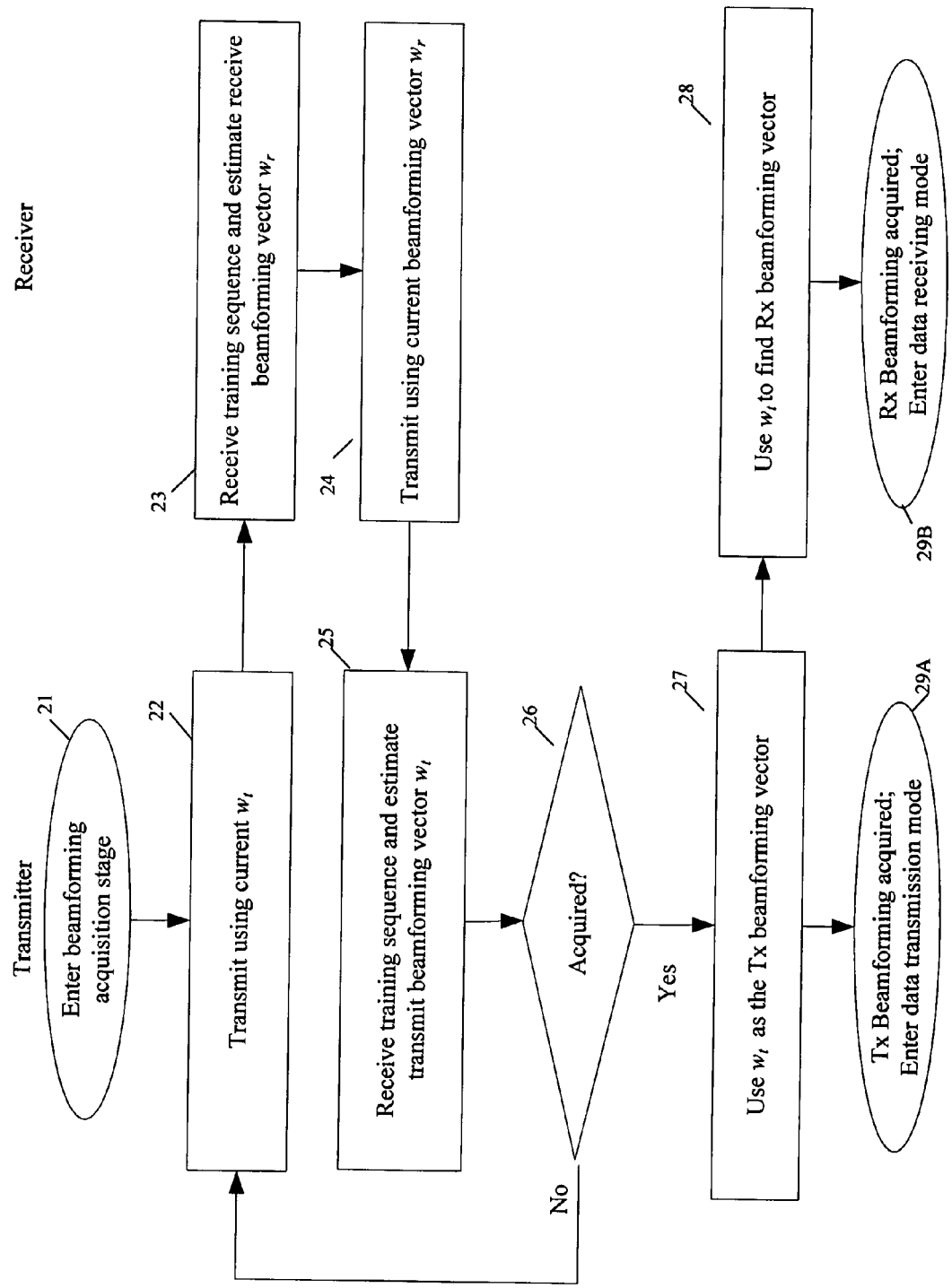
FIG. 2 shows an example iterative beam acquisition protocol for obtaining beamforming vectors for analog adaptive beamforming between two wireless transceivers, according to the present invention.

A beam searching (beam acquisition) process is initiated by the transmitter, although the receiver may send a request to the transmitter in order to initiate the acquisition process. In one scenario, the station 11 serves as the transmitter or signal source and the station 12 serves as the receiver or signal sink. Also, without loss of generality, a transmit beam is initiated by a properly chosen beamforming vector $w_t$. FIG. 2 shows an example iterative beam acquisition protocol 20 for obtaining beamforming vectors for analog adaptive beamforming between two wireless transceivers (e.g., stations 11, 12 in FIG. 1), by estimating interim receive and transmit beamforming coefficients alternatively until convergence, according to the present invention. The protocol 20 includes the steps of:

Step 21: A transceiver station STA1 enters the transmit mode as a transmitter (TX).

Step 22: Transmitter transmits a training sequence using the current transmit beamforming vector $w_t$.

Step 23: The training sequence originating from the transmitter is received at a transceiver station STA2 operating now in a receive mode as a receiver (RX), and the received training sequence is used to estimate a receive beamforming vector $w_r$. Preferably, the receiver computes an optimal receive beamforming vector $w_r$.

Step 24: The receiver then switches to a transmit mode and transmits a training sequence using a beamforming vector that is the same as the current receive beamforming vector $w_r$.

Step 25: The training sequence originating from station STA2 is then received at the station STA1 operating now in receive mode, and the received training sequence is used to estimate a transmit beamforming vector $w_t$.

Step 26: The above steps are repeated $N_{iter}$ times before converging to the final transmit and receive beamforming vectors, indicating that they are optimized. In each iteration step, it is determined if final transmit and receive beamforming vectors have converged and a beam-acquired state is achieved. If not, the process proceeds to step 22, otherwise the process proceeds to step 27.

Step 27: The station STA1 now operating in transmit mode uses the beamforming vector $w_t$ as a TX beamforming vector and transmits the TX beamforming training sequence to the station STA2.

Step 28: The station STA2 now operating in receive mode uses the beamforming training sequence to determine a final RX beamforming vector.

Step 29A: A final TX beamforming vector having been acquired, the station STA1 can enter data transmission mode using the TX beamforming vector.

Step 29B: A final RX beamforming vector having been acquired, the station STA2 can enter data receiving mode using the RX beamforming vector.

In estimating the transmit beamforming vector $w_t$, the station STA1 operates in receive mode while the station STA2 operates in transmit mode. Such an estimation method takes advantage of TDD-based wireless communication. Calibration may be used to compensate for channel mismatch due to asymmetric RF circuitry.

Beam Search Stages

Figure 3:
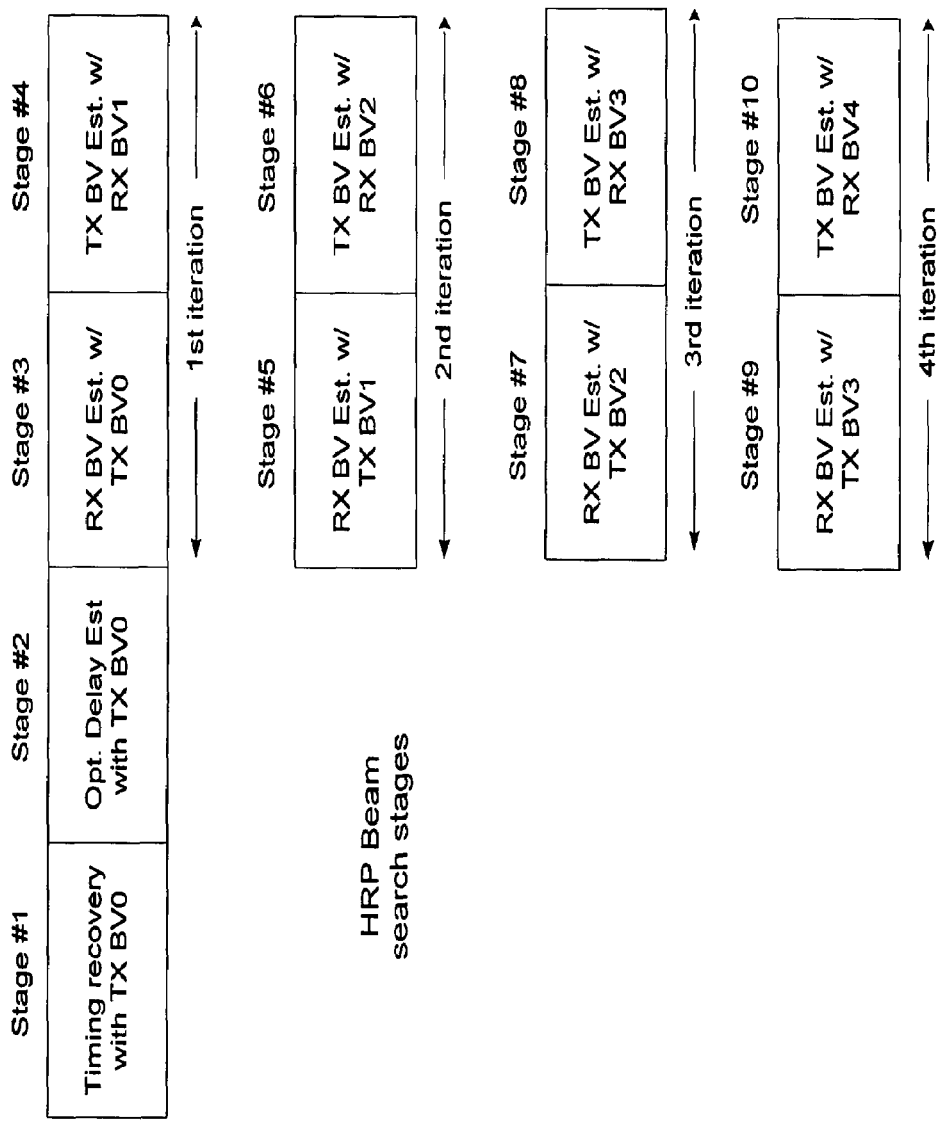
FIG. 3 shows an example beam search process for wireless stations according to the present invention.
Figure 4:
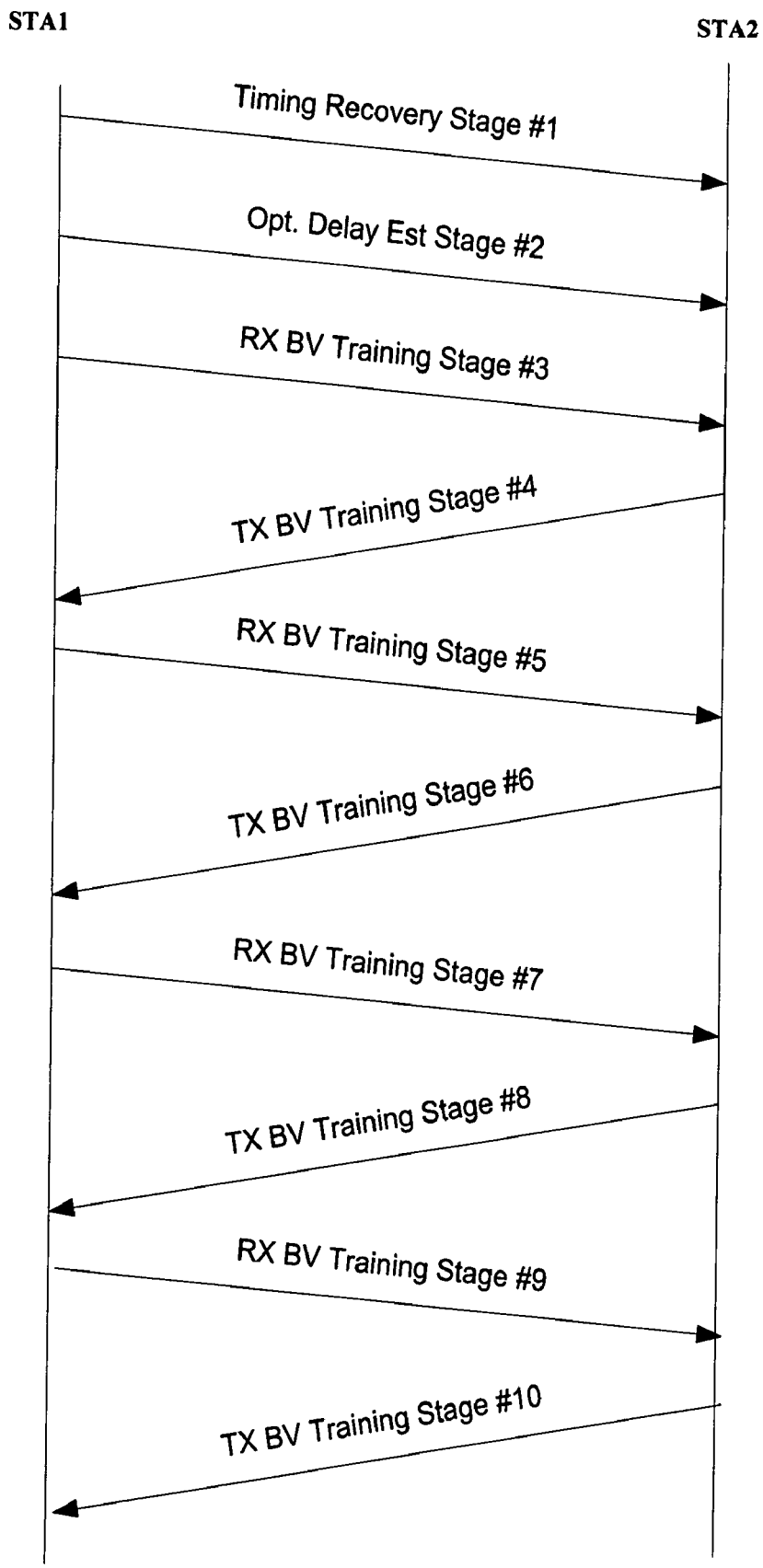
FIG. 4 shows an example message exchange process between wireless stations, according to the present invention.

FIG. 3 shows an example beam search process 30 for stations STA1 and STA2, including multiple stages using $N_{iter}=4$ iterations, according to a corresponding message exchange process 40 for stations STA1 and STA2 as illustrated in FIG. 4.

Stage 1 (Timing recovery with TX BV): This training period is used by the beamforming receiver to detect the beam search timing.

Stage 2 (Delay estimation with TX BV): This training period is used by the beamforming receiver to estimate the arrival time of the optimal beam.

During stages 1 and 2, the beamforming transmitter STA1 sends a specific training sequence while the transmitter BV is fixed to an arbitrary phase vector. The receiver STA2 receives the training sequence while the receiver BV switches between phase vectors within a set of weighting vectors spanning the entire space, typically an orthogonal matrix such as a Hardmard matrix or Fourier matrix.

The following 2 stages are repeated $N_{iter}$ times (I=0, 1, 2, . . . , $N_{iter}$) for beam searching:

Stage $3+2i$ (RX BV training with TX BV$3+2i$): During this period, the beamforming transmitter STA1 sends a specific training sequence to STA2 while the transmitter BV is fixed to the current transmit beamforming vector. The beamforming receive BV switches between phase vectors within the weight vector set used in stages 1 and 2, following a given order. The receiver STA2 uses the received sequence to estimate the optimum receiver BV $w_r$.

Stage $4+2i$ (TX BV training): During this period, the beamforming receiver STA2 sends a specific training sequence to STA1 while the BV is set to $w_r$ computed from the previous stage. The beamforming transmitter STA1 uses the received sequence to estimate the optimum transmit BV $w_t$ which is used in the next RX BV training stage.

The above beam search steps are described in further detail below.

Beam Search Sequence at STA1 and STA2

The beam search training sequence uses a pseudo random sequence (PRN). The sequence can be any random sequence with constant amplitude and good autocorrelation properties, such as an M-sequence. The PRN is modulated by digital modulation, such as Binary Phase Shift Keying (BPSK), Quadrature Phase Shift Keying (QPSK), Differential Binary Phase Shift Keying (DBPSK) or Offset Quadrature Phase Shift Keying (OQPSK), for transmission. The training sequence length depends on the actual link budget. A longer length is needed for a tight link budget. A link budget accounts for all of the gains and losses from the transmitter, through the medium (free space, cable, waveguide, fiber, etc.) to the receiver in a wireless communication system. The receive beamforming estimation protocol herein takes advantage of receiver side antenna diversity and achieves a link budget for implicit beamforming over wireless channels.

Beam Search Stage 1 (Timing Recovery) Training Sequence

The stage 1 training sequence is used for automatic gain control (AGC) and timing recovery estimation. The transmitter STA1 BV is fixed to an arbitrary vector while the receiver STA2 BV is changed over the AGC and timing recovery fields. The BV is switched between phase vectors within a set of weight vectors spanning the whole space, typically an orthogonal matrix such as a Hardmard matrix or Fourier matrix.

Beam Search Stage 2 (Delay Estimation) Training Sequence

The stage 2 training sequence also includes an AGC and delay estimation fields. The transmitter STA1 BV is chosen to be the same phase vector as that in stage 1. The receiver STA2 BV is changed over the delay estimation field. The BV is switched between phase vectors within a same set of weight vectors as stage 1.

Beam Search Stage 3 (RX BV Estimation) Training Sequence

During stage 3, the transmitter STA1 BV is chosen to be the same phase vector as that in stages 1 and 2. The receiver STA2 BV switches between phase vectors within a same set of weight vectors as stage 1.

Beam Search Stage 4 (TX BV Estimation) Training Sequence

The beamforming receiver STA2 serves as the transmitter at this stage with the transmit BV set to the phase vector calculated from stage 3. The receiver (beamforming transmitter) STA1 BV switches between phase vectors within a same set of weight vectors as stage 1.

Beam Search Stages 5, 7, 9 (RX BV Estimation) Training Sequence

During stages 5, 7 and 9, the transmitter STA1 BV is set to the phase vector calculated from stages 4, 6 and 8, respectively. The receiver STA2 BV switches between phase vectors within a same set of weight vectors as stage 1.

Beam Search Stages 6, 8, 10 (TX BV Estimation) Training Sequence

During stages 6, 8 and 10, the receiver STA2 BV is set to the phase vector calculated from stages 5, 7 and 9, respectively. The receiver (beamforming transmitter) STA1 BV switches between phase vectors within a same set of weight vectors as stage 1.

Beam Tracking

Figure 5:
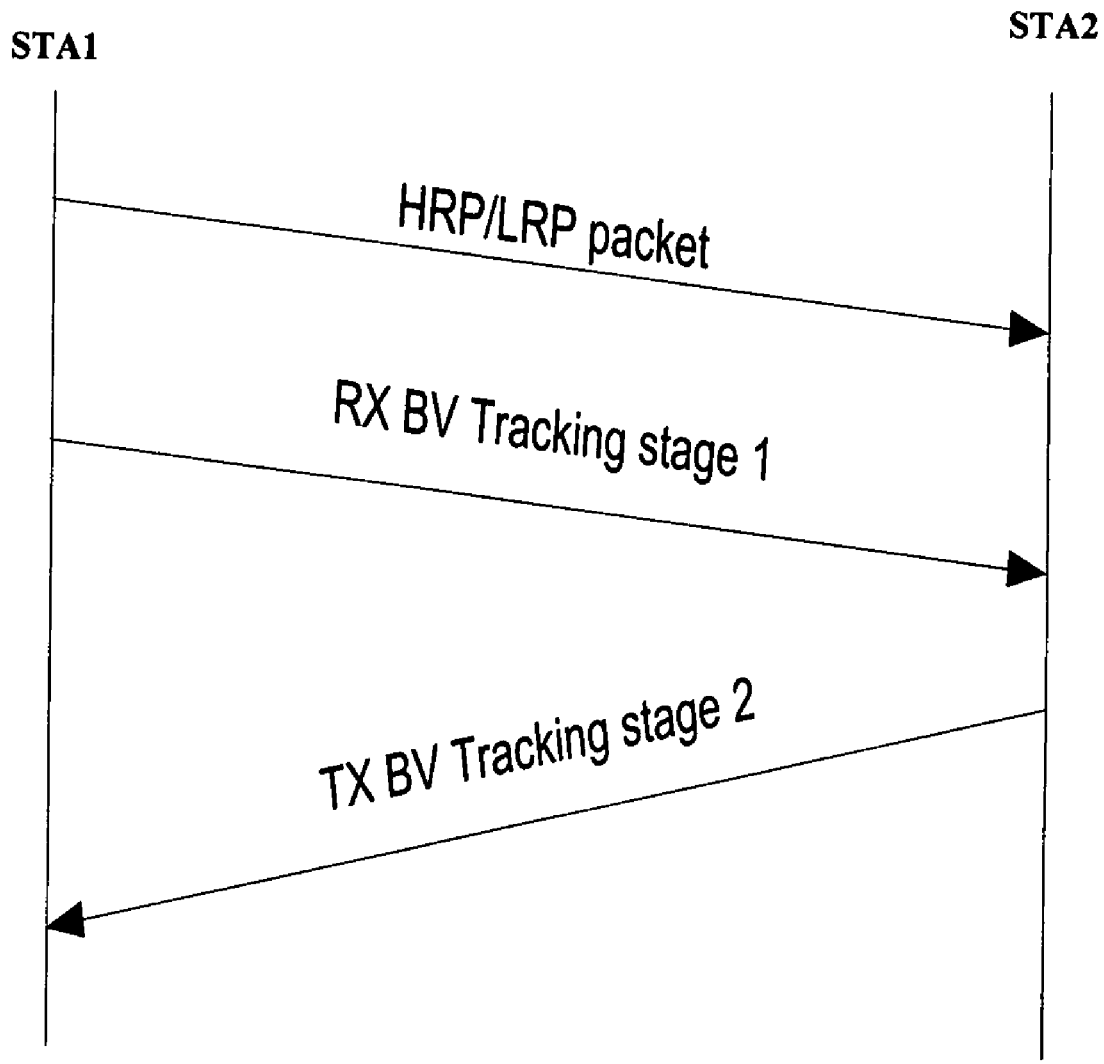
FIG. 5 shows an example beam tracking message exchange sequence in a beam tracking process, according to the present invention.

The beam tracking process includes two stages according to the beam tracking message exchange sequence 50 in FIG. 5. Beam tracking is used in a beam-deviated state according to the following two stages:

Stage 1 (RX BV tracking): During this period, the beamforming transmitter STA1 sends a specific training sequence while the transmitter BV is fixed to the current transmit beamforming. The beamforming receive BV switches between phase vectors within the weight vector set used in stages 1 and 2, following a given order. The receiver STA2 uses the received sequence to estimate the optimum receiver BV $w_r$.

Stage 2 (TX BV tracking): During this period, the beamforming receiver STA2 sends a specific training sequence while the BV is set to $w_r$ calculated from the previous stage. The beamforming transmitter STA1 uses the received sequence to estimate the optimum transmit BV $w_t$.

Implementation

Figure 6:
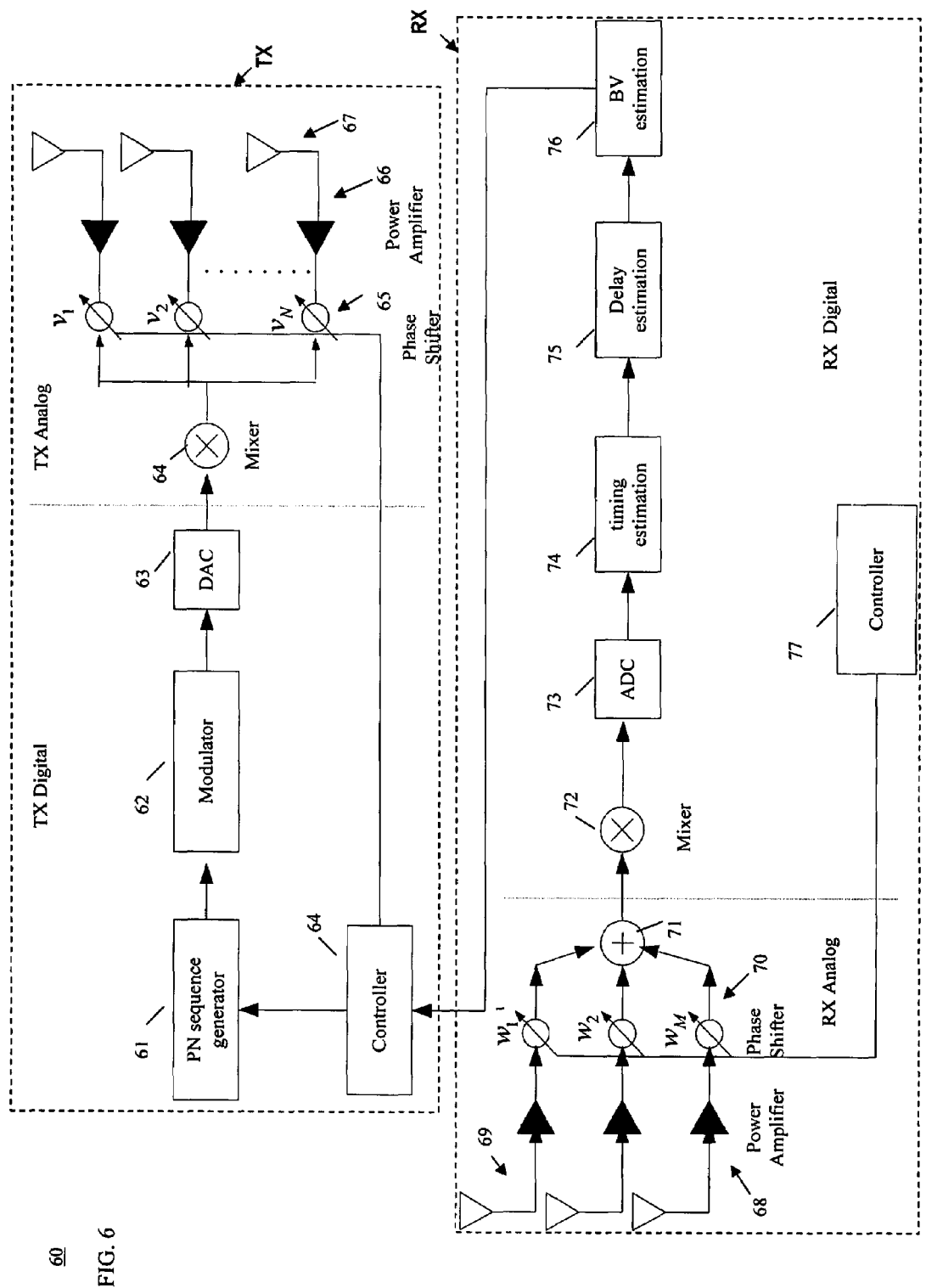
FIG. 6 shows an example implementation of an implicit beamforming framework in wireless system for adaptive analog beamforming, according to the present invention.

FIG. 6 shows an example implementation of the implicit beamforming framework in FIG. 1 as a wireless system 60 providing adaptive analog beamforming, according to the present invention. The wireless system 60 involves a transceiver including a transmitter (TX) and a receiver (RX) with multiple antennas, shown functioning during a training sequence for implicit determination of transmit and receive beamforming vectors $\bar{v}$ and $\bar{w}$, respectively.

In this example, $\bar{v}=[v_1, v_2, \ldots, v_N]^T$ is a collection of transmit analog beamforming weighting coefficients in vector form, and $\bar{w}=[w_1, w_2, \ldots, w_M]^T$ is a collection of receive analog beamforming weighting coefficients in vector form, wherein N is the number of transmit antennas and M is the number of receive antennas (N and M need not be the same).

The transmitter includes digital functions and analog functions. The digital functions include a PN sequence generator function 61, a modulator function 62, a DAC 63 and a controller function 64. The analog functions include a mixer function 65, a phase shifter array function 66 and a power amplifier array function 67 driving N transmit antennas 69a.

The receiver also includes digital functions and analog functions. The analog functions include a power amplifier array 68 driving M receive antennas 69b, a phase shifter array function 70 and a combiner function 71. The digital functions include a mixer function 72, an ADC function 73, a timing estimation function 74, a delay estimation function 75, a beamforming vector (BV) estimation function 76 and a controller function 77.

Before communication of actual payload data, a certain training sequence is transmitted from the transmitter. During training, the PN sequence generator 61 in generates a PN sequence specified with a particular pattern. The modulator 62 modulates the PN sequence with a particular waveform (e.g., BPSK, QPSK, DBPSK or OQPSK (offset QPSK)) to generate a baseband signal. The DAC 63 converts the modulated signal to an analog baseband signal, wherein the mixer 65 up-converts the baseband signal to an RF. The controller 64 controls both the PN sequence generator 61 to generate a desirable PN sequence at each stage, and also controls the phase value (transmit beamforming vector $\bar{v}$) in the phase shifter 65 for transmission of the sequence via the antenna array 69a as driven by the amplifier array 67.

During training, the receiver receives the training sequence via the antennas 69b, driven by the power amplifier array 68. The controller 77 controls the phase value (receive beamforming vector $\bar{w}$) in the phase shifter 70, for generating signals that are combined by the combiner 71 into an RF signal. The mixer 72 down-converts the RF signal to an analog baseband signal, and the ADC 73 converts the analog baseband signal into a digital signal. The time estimation function 74 implements stage 1 of the beam search process 30 described above (FIG. 3) and the delay estimation function 75 implements stage 2 of the beam search process 30 described above. The BV estimation function 76 determines optimal beamforming vectors ($\bar{v}$, $\bar{w}$) based on the received training sequence according to the iterative beam acquisition process 20 described above (FIG. 2).

The resulting beamforming vectors ($\bar{v}$, $\bar{w}$) are used to steer the transmit phase shifts in the transmission stages (i.e., the phase shifter array and power amplifier array) for communication of actual payload data.

Although FIG. 6 shows separate phase shifters and antennas for transmitter and receiver, in another example, the same set of phase shifters and antennas are reused for the transceiver by serving functions for transmitter or receiver at different time slots.

Accordingly, the present invention provides analog beamforming which involve iterative beam searching and beam tracking for implicit beamforming, using a receive beamforming estimation protocol based on receiver side antenna diversity and a link budget. The present invention enables estimating the transmit and receive beamforming vector such that the transmitter does not require final or interim receive beamforming vectors, and the receiver does not require final or interim transmit beamforming vectors.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method of analog beamforming in a wireless system including transceivers with multiple antennas, comprising the steps of:
   performing an iterative beam acquisition process based on beam search training; and
   determining optimized transmit and receive beamforming vectors comprising phase weighting coefficients, based on the iterative beam acquisition process;
   wherein each iteration includes estimating the receive and transmit beamforming coefficients alternatively, until the receive and transmit beamforming coefficients converge.

2. The method of claim 1 wherein the iterative beam acquisition process further includes:
   transmitting a first specific training sequence using a current transmit beamforming vector;
   receiving the specific training sequence; and
   switching a receive beamforming vector between phase vectors within a set of weighting vectors, following a given order, to estimate an optimum receive beamforming vector based on the received specific training sequence.

3. The method of claim 2 wherein the iterative beam acquisition process further includes:
   transmitting a second specific training sequence using the estimated optimum receive beamforming vector as a beamforming vector;
   receiving the second specific training sequence; and
   estimating an optimum transmit beamforming vector based on the received second specific training sequence.

4. The method of claim 3 wherein estimating an optimum transmit beamforming vector includes switching between phase vectors within said set of weighting vectors for estimating an optimum transmit beamforming vector based on the received second specific training sequence.

5. The method of claim 1 wherein performing beam search training further includes:
   transmitting a training sequence over a wireless channel;
   receiving the training sequence;
   estimating beam search timing and reception delay based on the received training sequence; and
   determining beamforming vectors based on the timing and delay estimation.

6. The method of claim 5 wherein performing beam search training farther includes:
   transmitting a specific training sequence while a transmit beamforming vector is maintained at an arbitrary phase vector; and
   receiving the training sequence while a receive beamforming vector is switched between phase vectors within a set of weighting vectors.

7. The method of claim 6 wherein:
   the training sequence includes timing estimation fields; and
   performing beam search training further includes:
      maintaining the transmit beamforming vector at an arbitrary vector while switching the receive beamforming vector over the timing estimation fields between phase vectors within a set of weighting vectors for timing estimation.

8. The method of claim 7 wherein:
the training sequence includes delay estimation fields; and
performing beam search training further includes:
maintaining the transmit beamforming vector at an arbitrary vector while switching the receive beamforming vector over the delay estimation fields between phase vectors within said set of weighting vectors for delay estimation.

9. The method of claim 1 wherein performing beam search training further includes generating a beam search training sequence using a pseudo random sequence, wherein the length of the pseudo random sequence is based on a link budget.

10. The method of claim 9 wherein performing beam search training further includes digitally modulating the pseudo random sequence for transmission.

11. The method of claim 1 further comprising the step of: during a receive beamforming training period, a beamforming transmitter transmits specific training sequence to a receiver while a transmit beamforming vector is maintained at a current transmit beamforming vector.

12. The method of claim 11 further comprising the step of: during the receive beamforming training period the receive beamforming vector being switched between phase vectors within a weight vector set used in timing recovery and delay estimation, the receiver using the received sequence to estimate an optimum receive beamforming vector.

13. The method of claim 12 further comprising the step of: during a transmit beamforming training period, a beamforming receiver transmitting a specific training sequence to a transmitter while the receive beamforming vector is set to the estimated receive beamforming vector.

14. The method of claim 13 further comprising the step of: during the transmit beamforming training period, a beamforming transmitter using the received sequence to estimate an optimum transmit beamforming vector for a next receive beamforming training stage.

15. The method of claim 1 further including estimating the transmit and receive beamforming vector such that the transmitter does not require final or interim receive beamforming vectors, and the receiver does not require final or interim transmit beamforming vectors.

16. The method of claim 1 further comprising performing beam tracking.

17. The method of claim 16 wherein beam tracking includes:
transmitting a first training sequence using a current transmit beamforming vector;
receiving the training sequence; and
switching a receive beamforming vector between phase vectors within a set of weighting vectors to estimate an optimum receive beamforming vector.

18. The method of claim 17 wherein beam tracking further includes:
transmitting a second training sequence using the receive beamforming vector as the beamforming vector;
receiving the training sequence; and
switching a transmit beamforming vector between phase vectors within the set of weighting vectors to estimate an optimum transmit beamforming vector.

19. The method of claim 1 wherein the wireless system comprises a wireless system operating in the 60 GHz frequency band.

20. A wireless transmitter, comprising:
an analog beamforming module configured for performing beam search training and performing an iterative beam acquisition process for finding transmit and receive beamforming vectors comprising phase weighting coefficients, each iteration including estimating the receive and transmit beamforming coefficients alternatively, until the receive and transmit beamforming coefficients converge; and
a phase shifter array configured for wireless communication using the beamforming vector phase weighting coefficients.

21. The transmitter of claim 20 wherein the analog beamforming module is further configured for performing the iterative beam acquisition process such that each iteration includes estimating the receive and transmit beamforming coefficients alternatively, until the receive and transmit beamforming coefficients converge into optimum beamforming vectors.

22. The transmitter of claim 21 wherein the beamforming module is further configured for:
transmitting from a transmitter side a first specific training sequence Si using a current transmit beamforming vector;
receiving a second specific training sequence S2 transmitted via a beamforming vector from a receiver side, calculated based on the first specific training sequence S1; and
estimating an optimum transmit beamforming vector based on the received second specific training sequence S2.

23. The transmitter of claim 22 wherein the beamforming module is further configured for estimating an optimum transmit beamforming vector by switching between phase vectors within a set of weighting vectors for estimating an optimum transmit beamforming vector based on the received second specific training sequence.

24. The transmitter of claim 21 further including a sequence generator configured for generating a beam search training sequence using a pseudo random sequence for beam search training, wherein the length of the pseudo random sequence is based on a link budget.

25. The transmitter of claim 24 further includes a modulator configured for digitally modulating the pseudo random sequence for transmission.

26. The transmitter of claim 21 further comprising a beam tracking fUnction configured for transmitting a first training sequence using a current transmit beamforming vector, receiving a second specific training sequence transmitted via a beamforming vector based on the first specific training sequence and estimating an optimum transmit beamforming vector based on the received second specific training sequence.

27. A wireless receiver, comprising:
an estimation module configured for beam search training;
an analog beamforming module configured for beamforming estimation based on receiver side antenna diversity and the beam search training, wherein beamforming estimation includes iterative beam acquisition process for finding optimized transmit and receive beamforming vectors comprising phase weighting coefficients, each iteration including estimating the receive and transmit beamforming coefficients alternatively, until the receive and transmit beamforming coefficients converge; and
a phase shifter array configured for wireless communication using the beamforming vector phase weighting coefficients.

28. The receiver of claim 27 wherein the estimation module is further configured for performing beam search training by:
  receiving a first training sequence Si;
  estimating beam search timing and reception delay based on the received training sequence; and
  determining receive beamforming vectors based on the timing and delay estimation.

29. The receiver of claim 27 wherein the estimation module is further configured for:
  receiving a specific training sequence transmitted using a fixed transmit beamforming vector; and
  switching a receive beamforming vector between phase vectors within a set of weighting vectors.

30. The receiver of claim 29 wherein:
  the training sequence includes timing estimation fields; and
  the estimation module is further configured for switching the receive beamforming vector over the timing estimation fields between phase vectors within a set of weighting vectors for timing estimation.

31. The receiver of claim 30 wherein:
  the training sequence includes delay estimation fields; and
  the estimation module is further configured for switching the receive beamforming vector over the delay estimation fields between phase vectors within said set of weighting vectors for delay estimation.

32. The receiver of claim 27 wherein the analog beamforming module is further configured for:
  receiving a first specific training sequence transmitted using a current transmit beamforming vector; and
  switching a receive beamforming vector between phase vectors within a set of weighting vectors, following a given order, for estimating an optimum receive beamforming vector based on the received specific training sequence.

33. The receiver of claim 27 wherein the analog beamforming module is further configured for:
  transmitting a second specific training sequence using the estimated optimum receive beamforming vector as a beamforming vector, for a transmitter to estimate an optimum transmit beamforming vector based on the received second specific training sequence.

34. The receiver of claim 33 further comprising a beam tracking function configured to transmit a training sequence using the receive beamforming vector as the beamforming vector, for a transmitter to estimate a transmit beamforming vector based on the received training sequence.

35. The method of claim 1, wherein each iteration includes alternating estimating the receive beamforming coefficients and the transmit coefficients for each stage of beamforming training sequences.

* * * * *